US00RE46842E

(19) United States
(12) Reissued Patent
Phaneuf et al.

(10) Patent Number: US RE46,842 E
(45) Date of Reissued Patent: May 15, 2018

(54) CONTAINER SEAL WITH RADIO FREQUENCY IDENTIFICATION TAG, AND METHOD OF MAKING SAME

(71) Applicant: eAgile Inc., Grand Rapids, MI (US)

(72) Inventors: Peter Phaneuf, Grand Rapids, MI (US); Gary P. Burns, Rockford, MI (US); Michael Isabell, Grand Rapids, MI (US)

(73) Assignee: eAgile Inc., Grand Rapids, MI (US)

(21) Appl. No.: 15/049,120

(22) Filed: Feb. 21, 2016

Related U.S. Patent Documents

Reissue of:
(64) Patent No.: 8,674,834
Issued: Mar. 18, 2014
Appl. No.: 13/086,907
Filed: Apr. 14, 2011

U.S. Applications:
(60) Provisional application No. 61/323,915, filed on Apr. 14, 2010, provisional application No. 61/360,550, filed on Jul. 1, 2010.

(51) Int. Cl.
*G08B 23/00* (2006.01)
*B65D 53/04* (2006.01)

(52) U.S. Cl.
CPC ..... *B65D 53/04* (2013.01); *B65D 2203/10* (2013.01); *Y10T 428/14* (2015.01); *Y10T 428/24802* (2015.01); *Y10T 428/2817* (2015.01)

(58) Field of Classification Search
CPC ..... B65D 53/04; B65D 2203/10; Y10T 428/2817; Y10T 428/14; Y10T 428/24802
(Continued)

(56) References Cited

U.S. PATENT DOCUMENTS 4,778,698 A * 10/1988 Ou-Yang ..... B65D 23/02 215/232
7,388,506 B2 6/2008 Abbott
(Continued)

FOREIGN PATENT DOCUMENTS

JP 2873252 B2 1/1999
WO 2002/28739 A2 4/2002
WO 2006/016184 A2 2/2006

OTHER PUBLICATIONS

European Office Action dated Jan. 21, 2017, 4 pgs.
(Continued)

*Primary Examiner* — Ovidio Escalante
(74) *Attorney, Agent, or Firm* — McGarry Bair PC

(57) ABSTRACT

A container closure assembly includes a closure, an inner seal, and a radio frequency identification tag. The inner seal comprises a sealable film laminated to a metallic foil, and includes a first surface for sealing engagement with a container sealing surface, and a second, opposed surface for non-scaling engagement with a backing liner, a facing liner, or a glued-in closure liner. The radio frequency identification tag includes a microprocessor electrically coupleable with an antenna for receiving, storing, and transmitting digitized information. The inner seal minimizes migration of fluids between a container interior volume and an exterior of a container when the inner seal is sealingly engaged with a container sealing surface. The radio frequency identification tag is includable in the closure assembly without the closure
(Continued)

assembly electromagnetically interfering with the receiving, storing, or transmitting of the digitized information.

27 Claims, 14 Drawing Sheets

(58) Field of Classification Search
USPC ..... 340/572.8, 10.1; 215/201; 235/385, 492; 277/321; 428/195.1, 347, 40.1
See application file for complete search history.

(56) References Cited

U.S. PATENT DOCUMENTS

| | | | | |
|---|---|---|---|---|
| 7,410,103 | B2 * | 8/2008 | Nagel | 235/492 |
| 7,772,981 | B1 * | 8/2010 | Lambert et al. | 340/572.8 |
| 7,782,212 | B2 | 8/2010 | Burns et al. | |
| 8,049,627 | B1 * | 11/2011 | Addante | 340/572.8 |
| 8,057,896 | B2 * | 11/2011 | Smelko et al. | 428/347 |
| 2005/0051624 | A1 * | 3/2005 | Kipp et al. | 235/385 |
| 2005/0162277 | A1 * | 7/2005 | Teplitxky et al. | 340/572.8 |
| 2007/0003725 | A1 * | 1/2007 | Yousif | 428/40.1 |
| 2007/0085689 | A1 * | 4/2007 | Brommer et al. | 340/572.8 |
| 2007/0182564 | A1 | 8/2007 | Abbott | |
| 2007/0289934 | A1 * | 12/2007 | Gancia | 215/201 |
| 2007/0296599 | A1 | 12/2007 | Wang et al. | |
| 2008/0024309 | A1 * | 1/2008 | Balhoff et al. | 340/572.8 |
| 2008/0068179 | A1 * | 3/2008 | Meyer | 340/572.8 |
| 2008/0258401 | A1 * | 10/2008 | Cotton | 277/321 |
| 2008/0309495 | A1 | 12/2008 | Chisholm | |
| 2009/0153334 | A1 * | 6/2009 | Burns et al. | B65D 51/20 340/572.8 |
| 2009/0306620 | A1 * | 12/2009 | Thilly | B65D 51/002 604/415 |
| 2010/0007501 | A1 * | 1/2010 | Yang et al. | 340/572.8 |
| 2010/0102967 | A1 * | 4/2010 | Lee | B65D 51/245 340/572.8 |
| 2010/0117797 | A1 * | 5/2010 | Bauchot et al. | 340/10.1 |
| 2011/0017739 | A1 * | 1/2011 | Tilton | B65D 41/045 220/258.3 |
| 2011/0169642 | A1 * | 7/2011 | Adstedt et al. | 340/572.8 |
| 2012/0107577 | A1 * | 5/2012 | Sachs et al. | 428/195.1 |

OTHER PUBLICATIONS

RFID Guidance for Graphic Communications Professionals. Types of RFID Printing. Aug. 5, 2007. University of Houston. Accessed Apr. 4, 2011. http://graphics.tech.uh.edu/student_work/RFID/types_of_printing.htm#flexography.

Favite Screen Printing. Copyright 2000-2008 Favite Inc. Accessed Apr. 4, 2011. http://www.favite.com/facilities_2.asp.

Induction sealing. Wikipedia. Dec. 10, 2007. Accessed Mar. 21, 2011. http://en.wikipedia.org/wiki/Induction_sealing.

Aluminum Foil Seals. Copyright 2008 Wuxi Glory Plastics Co. Ltd. Accessed Mar. 21, 2011. http://www.tjskl.org.cn/products/czafe5bb/aluminum_foil_seals-pz265ce83.html.

Lepel Induction Cap Sealing—Cap Liner Guide. Copyright 2007 Lepel. Accessed Mar. 21, 2011. http://www.cap-sealing.com/guide.php.

Favite Overview. Copyright 2000-2008 Favite Inc. Accessed Apr. 4, 2011. http://www.favite.com/facilities_1.asp.

* cited by examiner

CONTAINER SEAL WITH RADIO FREQUENCY IDENTIFICATION TAG, AND METHOD OF MAKING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit of U.S. Applications No. 61/323,915, filed Apr. 14, 2010, and No. 61/360,550, filed Jul. 1, 2010, each of which is incorporated by reference herein in its entirety.

BACKGROUND OF THE INVENTION

1. Field of the Invention

The invention relates to a container closure assembly having an integral radio frequency identification tag.

2. Description of the Related Art

Closable containers are utilized for a multitude of household and commercial products. Closures, such as threaded and flip-top caps, hinged closures, dispensing closures, and the like, are installed after filling the container with a selected product. Closures can have a relatively simple structure, or can include multi-layered liners providing selected functionality. A finished closure assembly may be a multi-part assembly, and may include, for example, a hard-shelled outer closure adapted for reclosable engagement with a container, one or more cushioning liners (also referred to as "wadding"), sealable films, desiccant inserts, and the like.

Container closure assemblies can be fabricated utilizing different processes. A specialty closure manufacturer may handle the entire process from raw materials to end product. Alternatively, fabrication of container closure assemblies may be handled by several specialty manufacturers. For example, closures may be produced and supplied as a stand-alone product by a manufacturer specializing in injection molding. If the closures are to utilize a liner, a liner fabricator may produce the liners and install them in the closures. Alternatively, closures and liners may be fabricated and provided separately to the manufacturer of the product destined for the container or to a specialty container filling operation, which assembles the closures and liners, and installs the assembled closure assemblies on the filled containers. The closures and liners may also be provided separately to a closure assembly operation, which assembles and supplies finished closure assemblies to the product manufacturer or filling operation. The entire process from fabrication to installation can involve numerous steps conducted by several different operators at several different locations, which may involve several packaging and transportation steps. All of this may add to the cost ultimately borne by the end-user, thereby increasing the value of the product enclosed by a container and closure assembly.

Many products, such as pharmaceuticals, foodstuffs, personal care products, household chemicals, and the like, may require protection against air and moisture while in a container. It is known that a metallic liner, such as an aluminum foil, is typically less permeable to air and moisture than a polymeric liner. Thus, closure assemblies may also include functionalities that impede the migration of air and moisture into the interior of the container.

Manufacturers, distributors, transporters, retailers, and/or end-users may wish to monitor or identify containers at various points throughout the distribution process. Furthermore, end-users typically expect some assurance that the purchased contents of a container are as advertised and produced by the manufacturer. Thus, closure assemblies may also include functionalities that prevent or signal unintended or unauthorized access to the contents of the container. Specialized sealing liners, often referred to as "tamper-proof seals" or "tamper-evident seals," can be installed over the filled container opening. Such seals are adapted so that the seal must be removed, destroyed, or distorted to gain initial access to the contents, thus indicating that tampering may have taken place. Nevertheless, tampering agents can replace or recreate a sealing liner so expertly that the deception may very likely be undiscovered.

Tampering can be minimized by controlling the transportation and storage of the filled containers. Radio frequency identification ("RFID") tags may be utilized to track containers and provide information concerning the products carried therein, such as the name of the product, its location and date of manufacture, an expiration date, an identification number, and the like. RFID tags typically consist of a microchip or microprocessor that can store such information, electrically coupled with an antenna. The antenna can receive an actuation signal from a remote transmitter and convey the signal to the microprocessor, to which the microprocessor can respond by transmitting stored information through the antenna to a remote reader. The microprocessor and the antenna can be mounted to a supporting substrate, which can include a label or wrapper, for extension along the exterior of the container and/or closure assembly.

RFID tags are frequently fabricated by a specialty RFID tag manufacturer that acquires the substrate material and microprocessors, and attaches the antennae and microprocessors to the substrate. The tag manufacturer may also add to the substrate information typically printed on a product label. The substrate/label can then be affixed to the exterior of the container and/or closure assembly. Alternatively, the product manufacturer may print and attach the product labels incorporating the RFID tags.

RFID tags may also be pre-encoded, unencoded, or omitted from the container and/or closure assembly. This may further complicate closure assembly fabrication and container filling by requiring that the fabricator responsible for adding the RFID tags to the final container and/or closure assembly perform additional operations on the RFID tags, such as encoding, verification, quality control, and the like. This can lead to inefficiencies and increased costs, and can complicate customization of the RFID tags.

Locating the RFID tag beneath a closure assembly can enhance protection of the tag during the shipping and handling process. However, should an RFID tag contact a metallic liner, the tag may be rendered completely inoperative, or the operational radius of the RFID tag may be significantly reduced. Polymeric liners do not suffer from this limitation. However, as discussed above, the higher permeability of polymeric liners may render their use undesirable.

Composite liners have been developed that consist of a metallic antenna portion coupled with a microprocessor, and a polymeric portion for appropriately isolating the microprocessor and optimizing the performance of the RFID tag.

While in many cases satisfactory performance of the RFID tag can be provided with this configuration, the composite liner is more permeable in those areas without an overlying metallic liner, effectively rendering the entire sealing liner relatively permeable, and thereby defeating the purpose of a metallic liner.

Optimizing the strength and fidelity of the transmission signal is dependent on the location of the RFID tag on or in the container. There are benefits to incorporating an RFID tag into the sealing liner. However, sealing liner fabrication methods may fail to accommodate satisfactory integration of the RFID tag with the sealing liner.

Consequently, it would be advantageous to employ some means in addition to a sealing liner to more effectively guard against tampering. It would also be advantageous if such a means could readily provide automated identification of a container and its contents to confirm that all containers in a shipment or lot are as expected for shipping, inventory control, customer order preparation, customs inspection, and the like. In particular, automated identification can comprise part of a control system that can account for each individual container during its shipment from manufacturer to end-user. In this way, both mistakes (e.g., mislabeling) and intentional deceptions can be detected and corrected before a product reaches an end-user.

BRIEF DESCRIPTION OF THE INVENTION

A container closure assembly includes a closure, an inner seal, and a radio frequency identification tag. The inner seal comprises a sealable file laminated to a metallic foil, and includes a first surface for sealing engagement with a container sealing surface, and a second, opposed surface for non-sealing engagement with a backing liner, a facing liner, or a glued-in closure liner. The radio frequency identification tag includes a microprocessor electrically coupleable with an antenna for receiving, storing, and transmitting digitized information. The inner seal minimizes migration of fluids between a container interior volume and an exterior of a container when the inner seal is sealingly engaged with a container sealing surface. The radio frequency identification tag is includable in the closure assembly without the closure assembly electromagnetically interfering with the receiving, storing, or transmitting of the digitized information.

*In a further embodiment, a container assembly includes a container having an interior volume and an opening into the interior volume, a closure covering the opening, and an exterior seal extending over the closure and an upper part of the container to minimize migration of content in the interior volume to an exterior of the container and contaminants from the exterior to content in the interior volume. An RFID tag including a microprocessor electrically coupled with an antenna for receiving, storing, and transmitting selected digitized information is mounted between the exterior seal and the container or closure without electromagnetic interference with the receiving, storing, and transmitting selected digitized information.*

DETAILED DESCRIPTION OF EXEMPLARY EMBODIMENTS OF THE INVENTION

Figure 2:
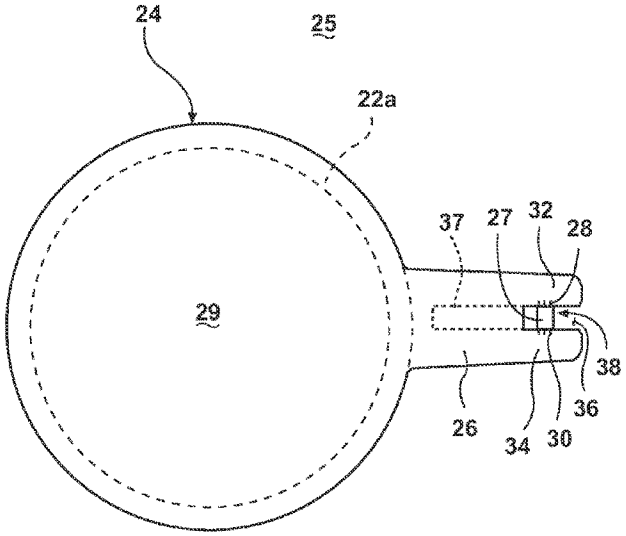
FIG. 2 is a perspective view from above of a first exemplary embodiment of an RFID tag according to the invention, as shown in FIG. 1.

Several exemplary embodiments of the invention described herein share common elements. To the extent an embodiment incorporates an element of another embodiment described herein, a like reference character will identify each like element, unless otherwise indicated. Moreover, an element of an embodiment having a configuration and/or function comparable to that of an element associated with another embodiment described herein is to be considered as operating and/or functioning in a like manner to such element associated with such other embodiment, and its description will not be repeated herein, except as otherwise indicated.

The following terms utilized in this application are defined as:

"Closure"—a structure or a device used to close off or seal a container, such as a bottle, a jar, a tube, and the like.

"Backing Liner"—a compressible material, such as pulp or foamed polyethylene, to which a facing liner is attached or adhered. This compressible material is typically retained against the end wall inner surface of the closure, and compensates for any irregularities along the sealing surface.

"Facing Liner"—a liner material attached or adhered to, or retained against, the backing liner. The facing liner can act as a barrier to chemically reactive products, particularly when an induction seal liner is not used.

"Finish"—the configuration of a container opening, shaped to accommodate a closure.

"Sealing Gasket"—a liner applied between the sealing surface of a container lip and the closure. A sealing gasket provides a complete seal, and need not be attached or adhered to the closure.

"Glued-In Closure Liner"—a liner attached to the end wall inner surface of the closure by an adhesive, generally a hot melt adhesive.

"Induction Seal Liner"—a specialized laminate containing a metallic foil and a plastic heat sealable film, which is used to hermetically seal a container opening using induction sealing technology.

"Inlay"—an electromagnetic device comprising a microchip and an antenna that can be programmed with information to identify an item to which the inlay is attached, transmit such information to a receiver, and receive additional information during the operating life of the inlay. Also referred to as an "RFID tag."

"Inner Seal"—a liner of sealing material applied over the opening of a container prior to or during the installation of a closure for minimizing migration of a substance into or out of the container, or tampering with the contents of the container.

"Liner"—a layer of paper, cork, foam, plastic, metal, and the like, which may be retained in a closure, to provide a flexible insert between the closure and the sealing surface of the container.

"Sealable Film"—a layer of material applied between the sealing surface of the container lip and an overlying liner or closure. A sealable film can be adhesively or thermally affixed to the sealing surface, and can be incorporated into a liner stock. A sealable film can be an inner seal.

"Sealing Surface"—the lip portion of the finish that makes contact with a sealing gasket, a sealing film, or a liner, and forms a seal.

Figure 1:
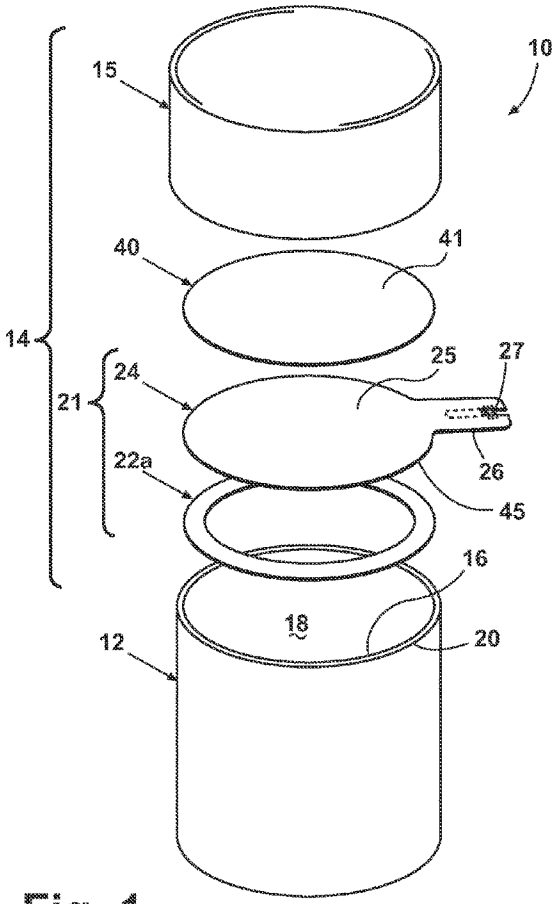
FIG. 1 is an exploded view of a first exemplary embodiment of the invention.

Referring now to the Figures, and initially to FIG. 1, a first exemplary embodiment according to the invention is illustrated comprising a container assembly 10. The container assembly 10 can include a container 12, and a closure assembly 14, including a reclosable protective closure 15 adapted for coupling with the container 12. The closure assembly 14 is exemplary, and can include alternative elements and/or configurations suitable for a selected closure functionality. For example, the closure assembly can be configured for a single use or for repeated uses.

The container 12 can have an opening 16 for providing access to an interior space 18, with a finish defined by a rim having a sealing surface 20. The closure 15 can be configured for suitable registry with the sealing surface 20 to facilitate sealing of the opening 16. For example, the closure 15 and container 12 can be adapted for threadable coupling, snap-fit coupling, bayonet-type coupling, and the like.

The container 12 is illustrated as cylindrical, although it can have any selected configuration, such as square, octagonal, and the like. The closure 15 is illustrated as cylindrical, although it also can have any selected configuration, including a configuration complementary to that of the container 12. Safety features can also be incorporated into the closure 15 to prevent unintended opening by small children.

FIG. 1 shows a first exemplary embodiment of the closure assembly 14 interposed between the closure 15 and the container 12. The closure assembly 14 can include an inner seal 21, comprising a sealable film 22a and a metallic foil 24 having a mounting tab 26, a radio frequency identification tag (hereinafter "RFID tag") 25, and a fold-over isolation liner 40 somewhat analogous to a facing liner, for maintaining electromagnetic separation of the RFID tag 25 from the metallic foil 24, as hereinafter described. The various elements comprising the closure assembly 14 can be configured based upon, for example, the item(s) to be contained, the environment in which the container will exist, the shelf life of the contents, protection against tampering, and the like. Closure assembly elements, such as a sealable film 22, a metallic foil 24, an isolation liner 40, and other liners, can be fabricated of one or more materials having properties suitable for the purposes intended, such as aluminum, paper, paperboard, cardboard, polymers, resins, and the like.

The metallic foil 24 is bonded to the container opening 16 through the sealable film 22a. The sealable film 22a can comprise a bonding agent, such as a single or multiple constituent adhesive, which can be heat activated, or activated during an induction sealing process, to bond the metallic foil 24 to the opening 16. The sealable film 22a can be a component separate from the metallic foil 24, or can extend along one surface of the metallic foil 24.

An annular sealable film 22a extendable only along the sealing surface 20 can be utilized with the metallic foil 24 or other selected liner. Alternatively, a circular sealable film 22b (FIG. 9) extendable along the sealing surface 20 and over the opening 16 can be utilized with the metallic foil 24 or other selected liner, with an annular portion of the circular sealable film 22b along the perimeter of the metallic foil 24 bondable to the sealing surface 20. The sealable film 22b can extend along the undersurface 45 of the metallic foil 24 to attach the metallic foil 24 to the sealing surface 20. References herein to a sealable film 22 should be construed to encompass an annular sealable film 22a or a circular sealable film 22b, unless indicated otherwise.

To optimize manufacturing efficiencies, a sealable film can be laminated to a metallic foil to form a sheet or roll stock. Individual liners can then be cut from the stock for incorporation into a closure assembly.

The sealable film 22 and the metallic foil 24 can be attached to the sealing surface 20 by an induction heating process. Alternative attachment methods, such as solvent-based adhesives, or hot plate bonding using a heat-activated adhesive, can be utilized. The sealable film 22 can also be a material that is fusible with the sealing surface 20, such as a thermoplastic or a thermoset, or a material facilitating laser welding, ultrasonic welding, induction welding, and the like.

The sealable film 22 can have dimensions complementary with the diameter and width of the sealing surface 20 for joining of the sealable film 22 to the sealing surface 20. The sealable film/sealing surface joint can have an in-place strength sufficient to prevent removal of the RFID tag 25 without deformation or destruction thereof. Consequently, the RFID tag 25 can be durably attached to the container 12 along the sealing surface 20, thus resulting in a tamper-evident seal.

The mounting tab 26 can include an isolation channel 36 bifurcating the tab 26. The isolation channel 36 can be located anywhere in the mounting tab 26, but is shown as located along a generally longitudinally bilateral axis (not shown), defining 2 generally symmetrical tag fingers 32, 34. The isolation channel 36 can have a preselected length, beginning generally, as shown in FIG. 2, at the ends of the tag fingers 32, 34 and terminating to enable the microprocessor 27 to be attached at a preselected location 37 along the isolation channel 36. Part or all of the RFID tag 25 can have a multi-layer configuration including one or more of a liner and/or a metallic foil having properties suitable for a selected container assembly configuration, a selected use environment, or selected contents.

The RFID tag 25 is illustrated in FIG. 2, and can comprise a generally circular metallic foil 24 smoothly transitioning from a minor arc to a radially-outwardly disposed mounting tab 26. Both the metallic foil 24 and the mounting tab 26 can be continuous, formed from the same foil, such as aluminum, having strength, durability, and electromagnetic properties suitable for the purposes described herein. The mounting tab 26 can be foldable generally along the minor arc to overlie the metallic foil 24.

The microprocessor 27 can be electromagnetically coupled to the mounting tab 26 through mounting contacts 28, 30, extending from the microprocessor 27 to the tag fingers 32, 34, respectively. The mounting contacts 28, 30 can be electromagnetically coupled to the metallic foil of the mounting tab 26 in a suitable manner, such as with a weldment, adhesives, and the like. The microprocessor 27 can be positioned within the isolation channel 36/37 to define a microprocessor bridge 38 spanning the isolation channel 36. Except for the coupling of the contacts 28, 30 with the tag fingers 32, 34, the microprocessor 27 can be electromagnetically isolated from the tag fingers 32, 34, and the metallic foil 24. Consequently, the metallic foil 24 and mounting tab 26 can comprise an antenna for the microprocessor 27, electromagnetically isolated from the microprocessor 27 except through the mounting contacts 28, 30.

The microprocessor 27 can have suitable storage capacity and performance characteristics for the purposes described herein. The microprocessor 27 can be programmable for tracking containers and providing information concerning the products carried therein, such as the name of the product, its location and date of manufacture, an expiration date, an identification number, and the like, that can be of significance to a manufacturer, transporter, distributor, wholesaler, retailer, or consumer. The microprocessor 27 can be selectively actuatable by radio frequency signals from a transmitter (not shown) configured for such purpose, including a mobile handheld transmitter, or a stationary transmitter. The microprocessor 27 can receive data from a transmitter, which the microprocessor 27 can store, such as updates to the container's location, the location and/or identity of the party currently in possession of the container, the current time and date, and the like. Radio frequency signals from a transmitter can also actuate the microprocessor 27, which can, in response, send data stored therein to a receiver (not shown) via radio frequency signals.

Referring again to FIG. 1, the fold-over isolation liner 40 can be a generally circular, disc-like body fabricated of a material, such as a closed-cell foam, providing electromagnetic insulative properties. The isolation liner 40 is shown in FIG. 1 intermediate the RFID tag 25 and the closure 15. The fold-over isolation liner 40 can be disposed over, and in unattached contact with, an upper surface of the metallic foil 24. Alternatively, the isolation liner 40 can be attached to the metallic foil 24 through an adhesive or other suitable means to maintain the isolation liner 40 in a selected position relative to the metallic foil 24. With either configuration, the mounting tab 26 can be folded over the isolation liner 40 to extend along a fold-over surface 41 of the isolation liner 40, maintaining electromagnetic isolation of the microprocessor 27 relative to the antenna/metallic foil 24. The closure 15 can be attached over the isolation liner 40, the RFID tag 25, and the opening 16 to protect the RFID tag 25 during shipping and handling.

The microprocessor 27, in the above-described configuration, can be fully functional due to its electromagnetic isolation from the metallic foil 24 beginning with the time the closure assembly 14 is installed to the container 12 until the RFID tag 25 is removed. The RFID tag 25 can be removed from the container 12 after removal of the closure 15, and then discarded, by utilizing the mounting tab 26 as a pull tab. Should an end-user remove the closure 15 to discover that the RFID tag 25 has been disturbed or removed, the end-user can be alerted that the contents of the container assembly 10 may have been tampered with, and advised to take appropriate action.

The RFID tag 25 can provide several necessary functions in a single sealing device. The opening 16 can be overlain in its entirety by a metallic foil 24, thereby providing a seal that is virtually impermeable to liquids and gases. The shelf life of the contents of a container assembly incorporating a metallic foil can therefore be substantially increased over that of a container assembly incorporating a polymeric film. The metallic foil 24 can be readily attached to the sealing surface 20 through one of several methods. At the same time, the RFID tag 25 can be available to provide critical information about the contents, such as the manufacturer, age, contents, visual description, and the like, utilizing transmitters and receivers. Moreover, the mounting tab 26 can serve as a pull tab, enabling a consumer to readily gain access to the contents of the container assembly 10.

Figure 4:
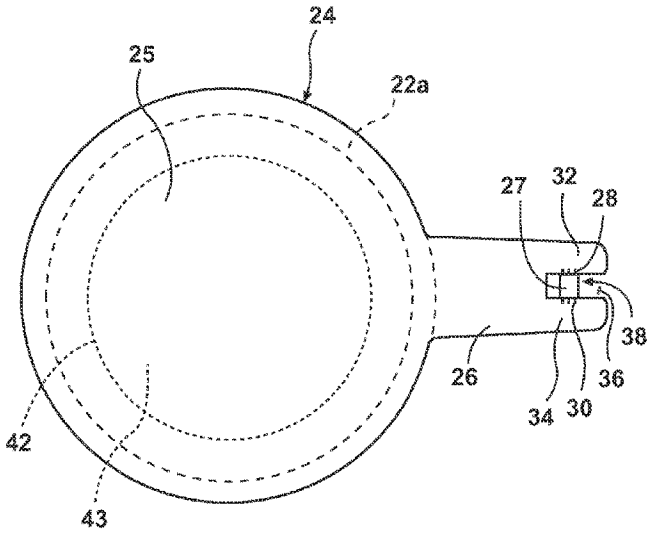
FIG. 4 is a perspective view from above of a second exemplary embodiment of an RFID tag according to the invention, as shown in FIG. 3.
Figure 3:
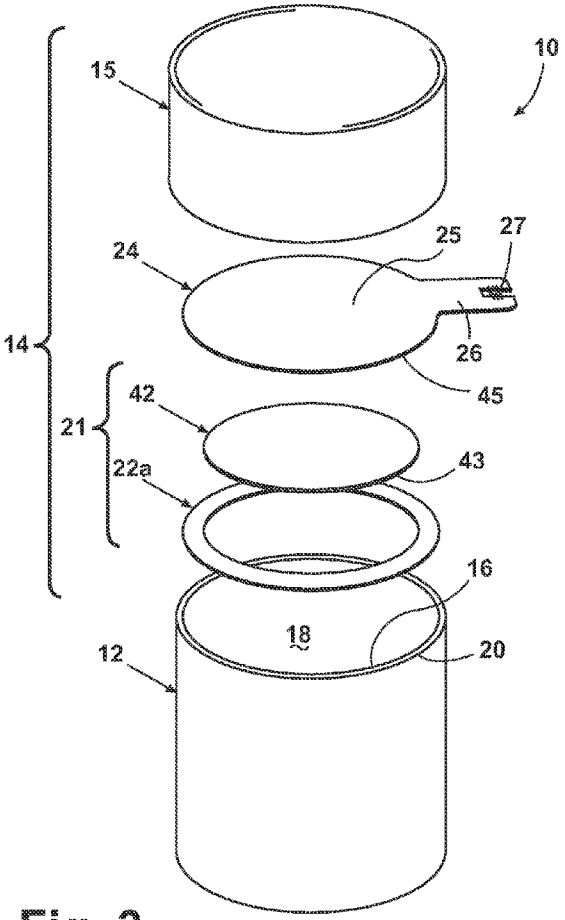
FIG. 3 is an exploded view of a second exemplary embodiment of the invention.

Referring now to FIGS. 3 and 4, a second exemplary embodiment of a closure assembly 14 and an RFID tag 25 are illustrated. The second embodiment of the RFID tag 25 is identical to the first embodiment, but the mounting tab 26 can be folded under the metallic foil 24 and, consequently, utilizes a fold-under isolation liner 42. The fold-under isolation liner 42 can serve generally the same purpose as the fold-over isolation liner 40 and can be fabricated of the same material as the fold-over isolation liner 40. However, the fold-under isolation liner 42 can have a diameter no larger than the inner diameter of the sealing surface 20 to avoid interfering with the adhesion of the sealable film 22 to the sealing surface 20.

The fold-under isolation liner 42 can be affixed to the underside of the metallic foil 24 and/or the sealable film 22, thereby defining a fold-under surface 43. The mounting tab 26 can then be folded under the fold-under isolation liner 42 to extend along the fold-under surface 43. Subsequently, the metallic foil 24 and attached isolation liner 42 can be sealed to the sealing surface 20, with the mounting tab 26 extendable into the interior space 18. The closure 15 can be attached over the fold-under isolation liner 42, the RFID tag 25, and the opening 16, to provide enhanced protection for the RFID tag 25.

The configuration of the mounting tab 26 can be as disclosed for the first embodiment RFID tag 25. The metallic foil 24 and mounting tab 26 can perform as an antenna for the microprocessor 27, which can be isolated from the metallic foil 24 by the fold-under isolation liner 42, except through the mounting contacts 28, 30.

Figure 6:
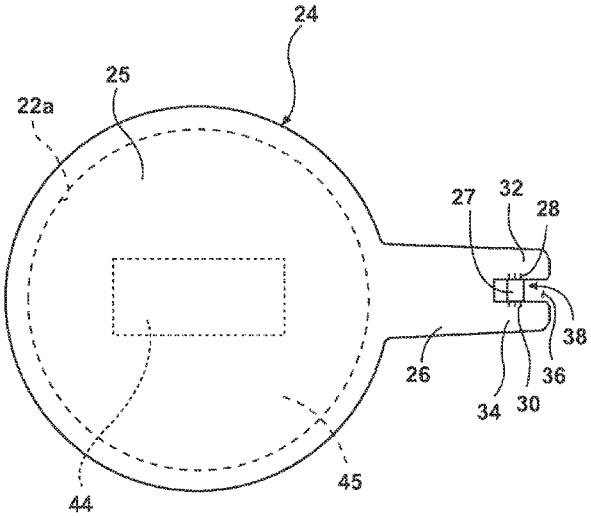
FIG. 6 is a perspective view from above of a third exemplary embodiment of an RFID tag according to the invention, as shown in FIG. 5.
Figure 5:
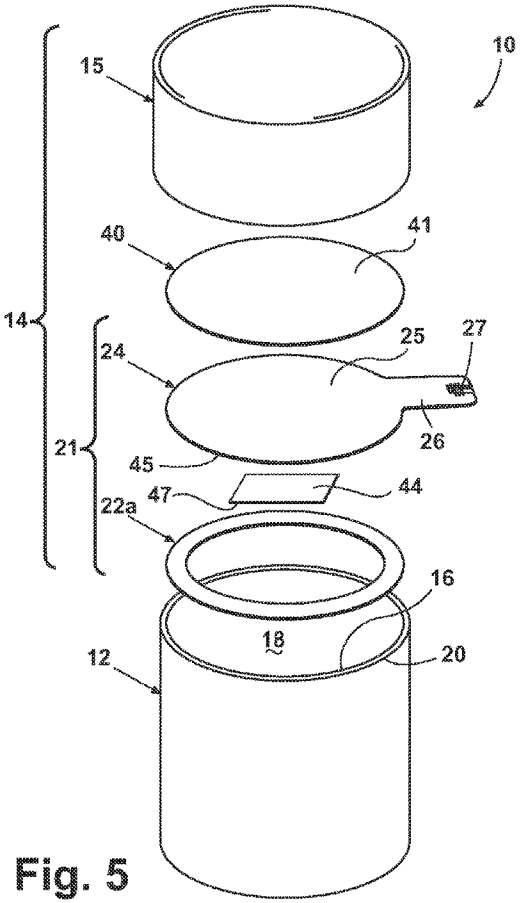
FIG. 5 is an exploded view of a third exemplary embodiment of the invention.

FIGS. 5 and 6 illustrate a third exemplary embodiment of a closure assembly 14, including an RFID tag 25, generally as described for the first exemplary embodiment, and a fold-under isolation pad 44. The fold-under isolation pad 44 is illustrated as comprising a rectilinear "patch" affixed to the underside 45 of the metallic foil 24, and is utilized in place of the fold-under isolation liner 42. The fold-under isolation pad 44 can have a size and configuration sufficient to isolate the microprocessor 27 from the metallic foil 24 when the mounting tab 26 is folded under. Optionally, the isolation pad 44 can be affixed to the upper side of the metallic foil 24 as a "fold-over" isolation pad (not shown). The pad 44 can also take any shape, regular or irregular, any thickness, or any position on the metallic foil 24, consistent with the functional and operational characteristics of an isolation liner as described herein.

The mounting tab 26 and RFID tag 25 can be folded so that the microprocessor 27 is in contact with a fold-under pad surface 47 of the isolation pad 44 and thereby electromagnetically isolated from the metallic foil 24. The attachment of the isolation pad 44 to the underside of the metallic foil 24 can be accomplished during fabrication of the RFID tag 25, as opposed to incorporating the isolation pad 44 into the RFID tag 25 as a separate component of the closure assembly 14. The relatively small footprint of the isolation pad 44 can facilitate attachment of the metallic foil 24 to the sealing surface 20, and the fabrication of the closure assembly 14, by reducing the potential for contact of the isolation pad 44 with the sealable film 22.

The isolation pad 44, whether used as a fold-under or a fold-over isolation pad, can also serve as a label for displaying information, such as dosage instructions, to a consumer who might overlook the same information on the side of the container assembly 10.

Figure 7:
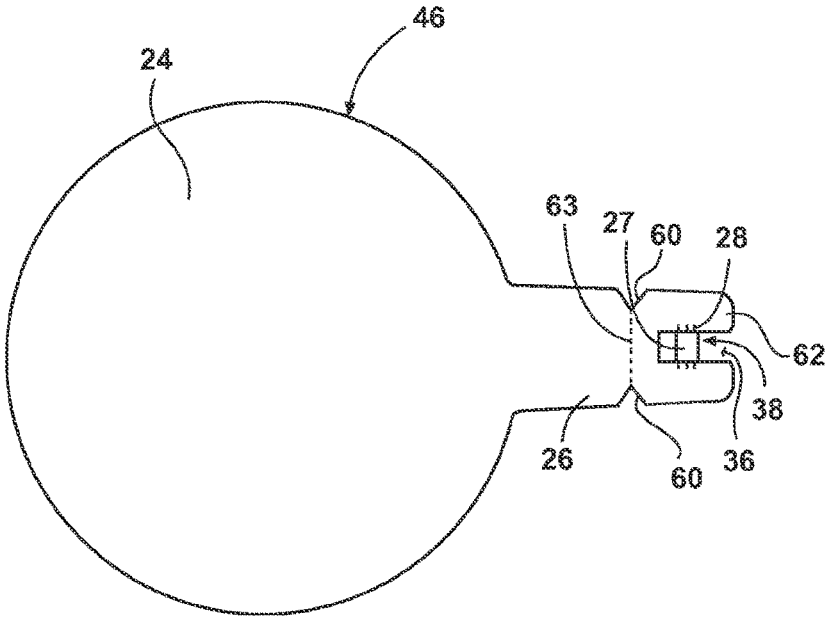
FIG. 7 is a perspective view from above of a fourth exemplary embodiment of an RFID tag according to the invention.

FIG. 7 illustrates a fourth exemplary embodiment of an RFID tag 46 that can be identical to the RFID tag 25 except for a pair of opposed tab notches 60 along the lateral edges of the mounting tab 26. A tear line 63 can connect the notches 60 to define a tear-off tab 62 comprising an end portion of the mounting tab 26 having the microprocessor 27. This can facilitate removal of the microprocessor 27 from the remainder of the RFID tag 46, thereby deactivating the RFID tag 46. The mounting tab 26 can be placed in a folded-over or folded-under configuration as previously described herein. Alternatively, the mounting tab 26 can extend along the interface between the container 12 and the closure 15 to project along the side of the container 12 away from the closure 15, thereby facilitating removal of the tear-off tab 62 prior to the initial removal of the closure 15. Thus, the tear-off tab 62 can be removed by a consumer immediately upon acquiring the container assembly 10 and product contained therein. The tear-off tab 62 can be protected by an overlying wrapper (not shown) attached to or enclosing at least a portion of the container 12, which can be readily removed by a consumer to access the tear-off tab 62.

Figure 8:
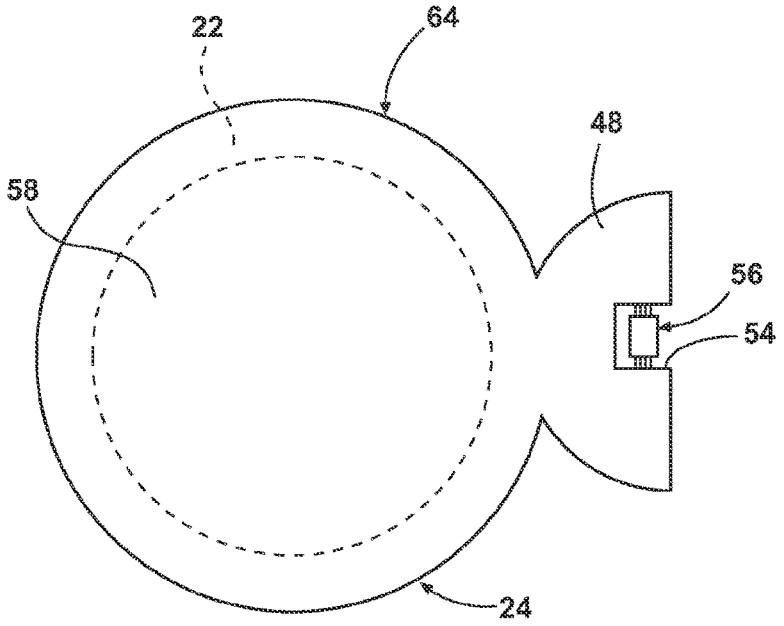
FIG. 8 is a perspective view from above of a fifth exemplary embodiment of an RFID tag according to the invention.

FIG. 8 illustrates a fifth exemplary embodiment of an RFID tag 64 that can include a semicircular pull tab 48 coupled with a metallic foil 24. The metallic foil 24 can be affixed to the sealing surface 20 of a container opening 16 through a sealable film 22 as previously described herein. The metallic foil 24 can be coupled with the pull tab 48 to enable the pull tab 48 to be folded over the metallic foil 24 in complementary disposition therewith. The pull tab 48 can include an isolation channel 54 to accommodate a microprocessor bridge 56. A disc-like fold-over isolation liner 58 having suitable electromagnetic insulation properties, size, configuration, and thickness, can be affixed to the upper surface of the metallic foil 24 so that the pull tab 48 and the microprocessor 27 can be folded over the isolation liner 58 adjacent, yet separated from, the metallic foil 24.

The pull tab 48 and metallic foil 24 can act as an antenna in a manner similar to that disclosed relative to the first embodiment. Thus, a pull tab 48, including an electromagnetically isolated microprocessor bridge 56, can be part of a seal that can be readily removed from the container 12, while operating as an RFID tag.

Figure 9:
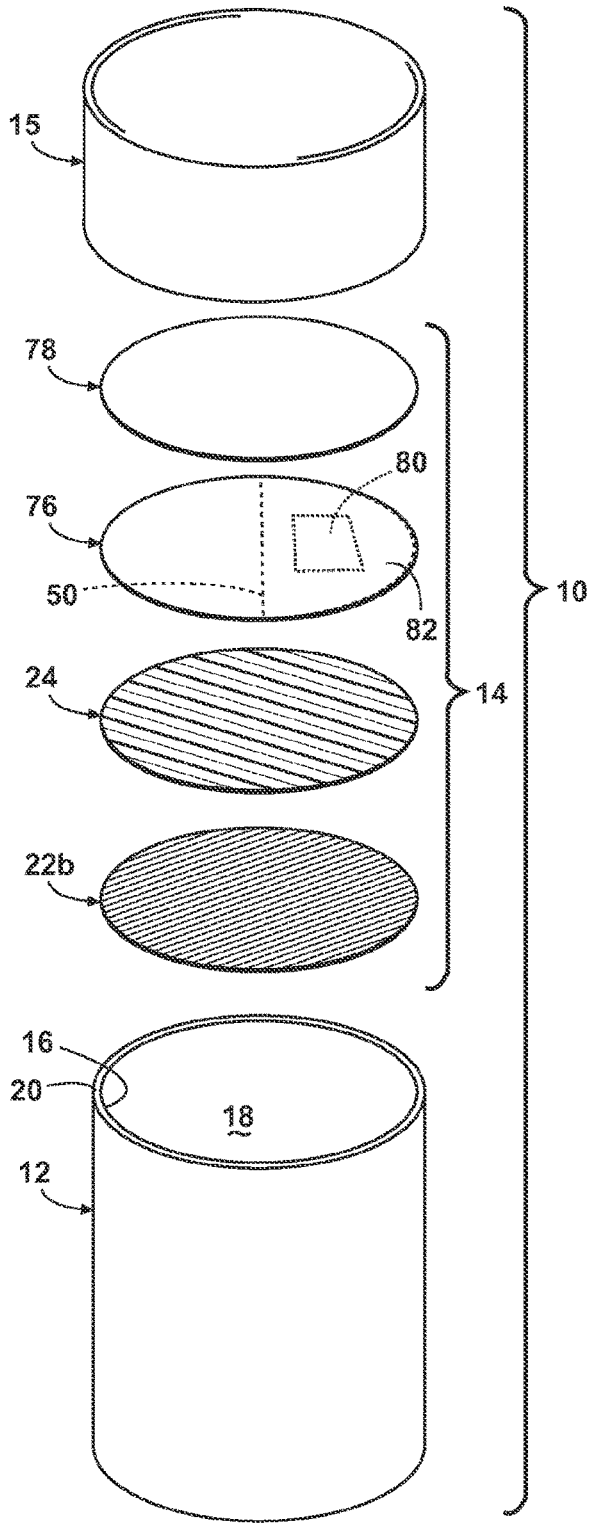
FIG. 9 is an exploded view of a sixth exemplary embodiment according to the invention including an RFID pull-tab liner.

Referring now to FIG. 9, a sixth exemplary embodiment of a closure assembly 14 according to the invention is illustrated. The sixth embodiment is similar to the previously described embodiments, and includes the container 12, the closure 15, a sealable film 22b (the illustrated sealable films 22a, 22b can be utilized in the alternative), the metallic foil 24, a pull-tab liner 76, and a backing liner 78, also referred to as a "wad." The closure assembly 14 can include different elements than shown in FIG. 9 depending upon, for example, factors such as the pertinent properties of the item(s) to be contained, and the type (e.g. moisture, tampering) and degree of protection specified.

The pull-tab liner 76 can comprise a multi-layered liner incorporating a pull-tab 82 for grasping by a user to remove the closure assembly 14 and gain access to the interior space 18 of the container 12. The pull-tab liner 76 can be interlayered with the sealable film 22 and the metallic foil 24. Alternatively, the metallic foil and sealable film can be integrated into the pull-tab liner 76 to form a unitary liner having both pull-tab and sealing functionalities. The metallic foil 24 can be omitted and replaced with an alternate material, such as the backing liner 78, a facing liner, or an inner seal, if tampering is a concern but exposure of the contents of the container to fluids is not. The backing liner in 78 can be disposed between the pull-tab liner 76 and the closure 15. The backing liner 78 can be fixedly incorporated into the closure 15 separate from the remaining elements of the closure assembly 14.

Figure 13:
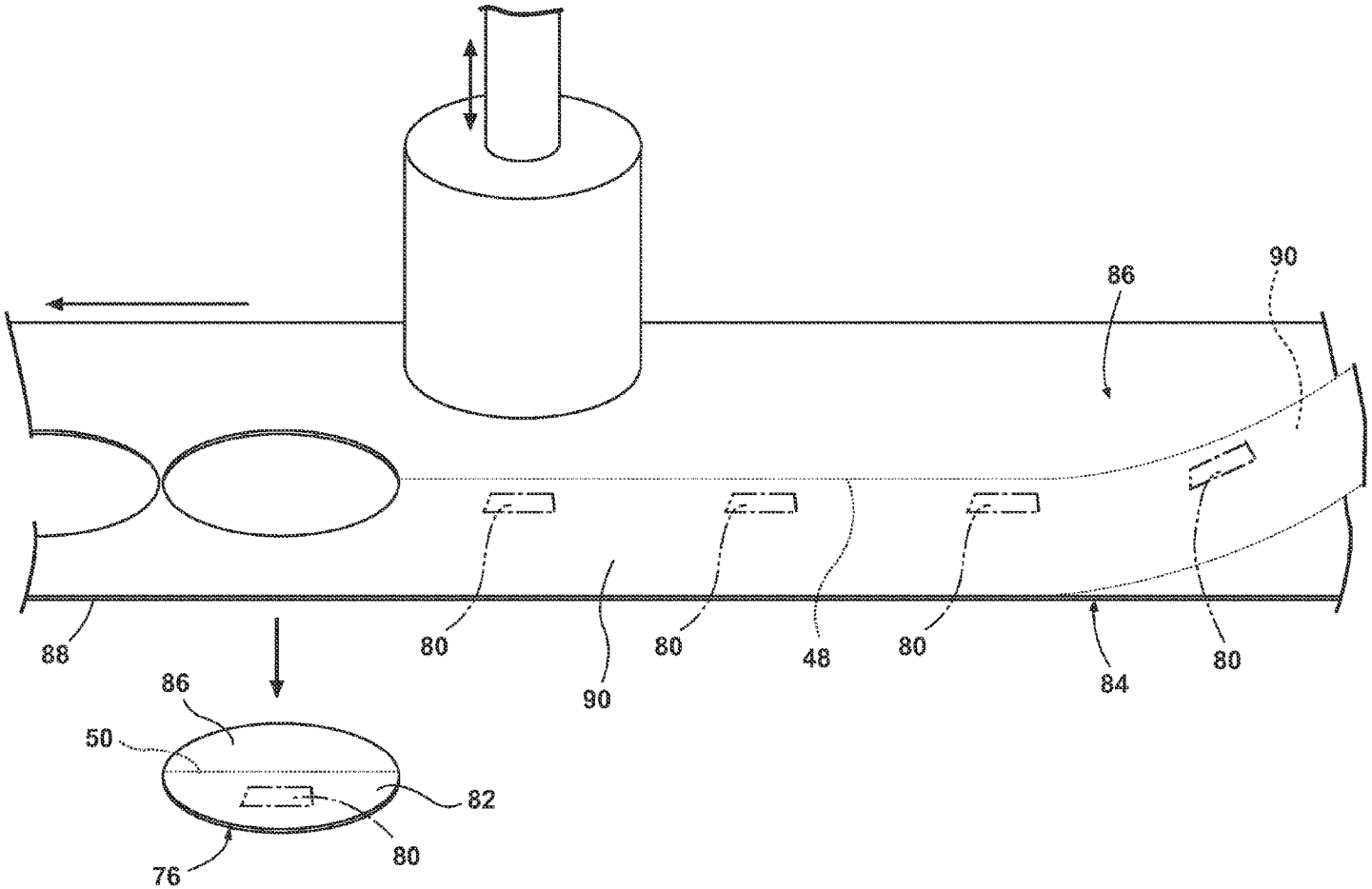
FIG. 13 is a schematic representation of a process of fabricating the RFID pull-tab sealing liner of FIG. 9.

Referring also to FIG. 13, the pull-tab liner 76 with an incorporated RFID tag 80 can be manufactured from a sheet stock or roll stock material 84. The stock material 84 can be supplied in rolls or sheets suitable for a continuous manufacturing process, and can include one or more of a substrate 86, which can selectively serve as an inner seal or liner, a sealable film material 88 underlying the substrate 86, and a pull-tab ribbon 90, layered together. The manufacturing process can include an RFID antenna production step, and a "flip chip" bonding step to couple microprocessors with antennas to produce an inlays or RFID tags 80. The process can also include a laminating step to laminate the RFID tags 80 to products.

The RFID antenna production step can include one of several processes, such as copper or aluminum etching, or silver ink printing utilizing screen printing, flexographic printing, gravure printing, or ink jet printing, on the substrate 86. Antennas can also be produced by electroless plating, utilizing screen printing, flexographic printing, gravure printing, or ink jet printing, to print a catalyst ink on a substrate 86, then depositing conductive metal onto the catalytic ink by electroless plating.

Antennas can be produced by electroplating, utilizing screen, flexographic, gravure, or ink jet printing, to print a conductive ink on a substrate 86, then electroplating conductive metal onto the conductive ink. The antenna production step can be followed by the "flip chip" bonding step, to provide regularly-spaced RFID tags 80 incorporated into the stock material 84.

Figure 10:
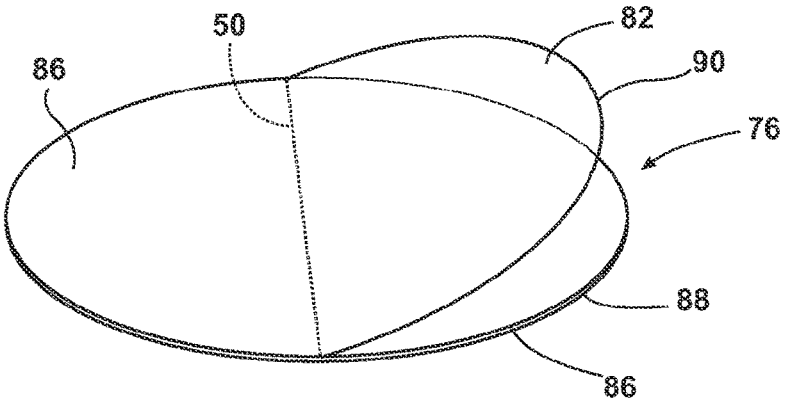
FIG. 10 is an enlarged view of a pull-tab sealing liner prior to the incorporation of an RFID device therewith.

A pull-tab ribbon 90 of material, such as a polymer, a paper/polymer composite, a metallic/polymer composite, and the like, having a width somewhat less than the width of the substrate 86, can be aligned longitudinally with the substrate 86 and sealed to the substrate 86 to form a pull-tab 82 able to rotate longitudinally about a pull-tab hinge line 50 away from the substrate 86, as shown in FIG. 10. Alternatively, the pull-tab ribbon 90 can have a width equal to the width of the substrate 86, with ½ the width of the pull-tab ribbon 90 longitudinally attached to the substrate 86 to form the hinged pull-tab 82. In either case, RFID tags can be attached to sheet stock or roll stock material 84, such as the pull-tab ribbon 90, instead of the substrate material. The pull-tab ribbon 90 with attached RFID tags 80 can be combined with the substrate 86, or can be supplied to a seal manufacturer, a closure manufacturer, a liner fabricator, a filling operation, and the like, for incorporation into a closure assembly.

Figure 11:
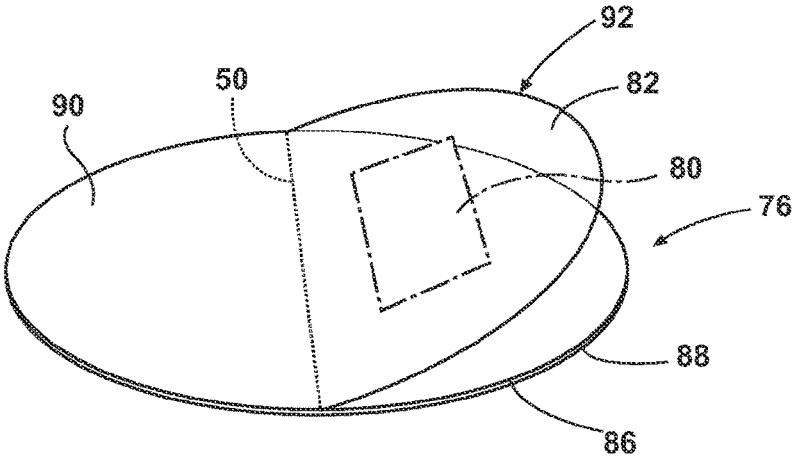
FIG. 11 is an enlarged view of the RFID pull-tab sealing liner of FIG. 9.

The regularly-spaced RFID tags 80 can be incorporated into the pull-tab ribbon 90 prior to or generally contemporaneously with the attachment of the pull-tab ribbon 90 to the substrate 86. The RFID tags 80 can be attached to the top side or underside of the pull-tab ribbon 90 to form a hinged pull-tab 82 having an RFID tag 80, as shown in FIG. 11. Alternatively, the RFID tags 80 can be incorporated into the top side of the substrate 86.

Figure 12:
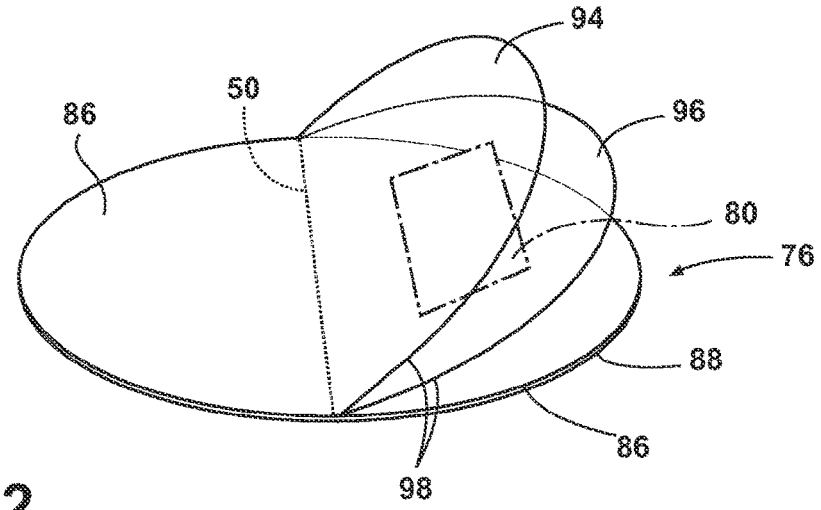
FIG. 12 is an enlarged view of a seventh exemplary embodiment of the RFID pull-tab sealing liner of FIG. 9.

In a seventh exemplary embodiment, illustrated in FIG. 12, the pull-tab ribbon 90 can comprise a double layer including a top liner 94 and a separate bottom liner 96 attached to the substrate 86 to form a hinged pull-tab 98. The top liner 94 and the bottom liner 96 can be separately rotated about the hinge line 50.

During the fabrication process, the top and bottom liners 94, 96 can be separated to enable the RFID tags 80 to be inserted therebetween, corresponding to the selected location of the RFID tags 80 in the finished pull-tab 82. Subsequent sealing of the top liner 94 to the bottom liner 96 can enclose the RFID tags 80 within the pull-tab ribbon 90.

The pull-tab 82 can alternatively include a combined hinge and tear line to enable selective removal of the pull-tab 82, and the incorporated RFID tag 80, from the pull-tab liner 76. Subsequently, individual closure assemblies 14 of a preselected configuration can be separated from the stock material 84 through methods, such as punching as shown in FIG. 13, laser cutting, and the like.

Alternatively, the RFID tag 80 can be inserted between any two of the several layers comprising the closure assembly 14, such as between the pull-tab liner 76 and the backing liner 78, between the backing liner 78 and the closure end wall inner surface, between a facing liner and the backing liner 78, and the like.

Figure 14:
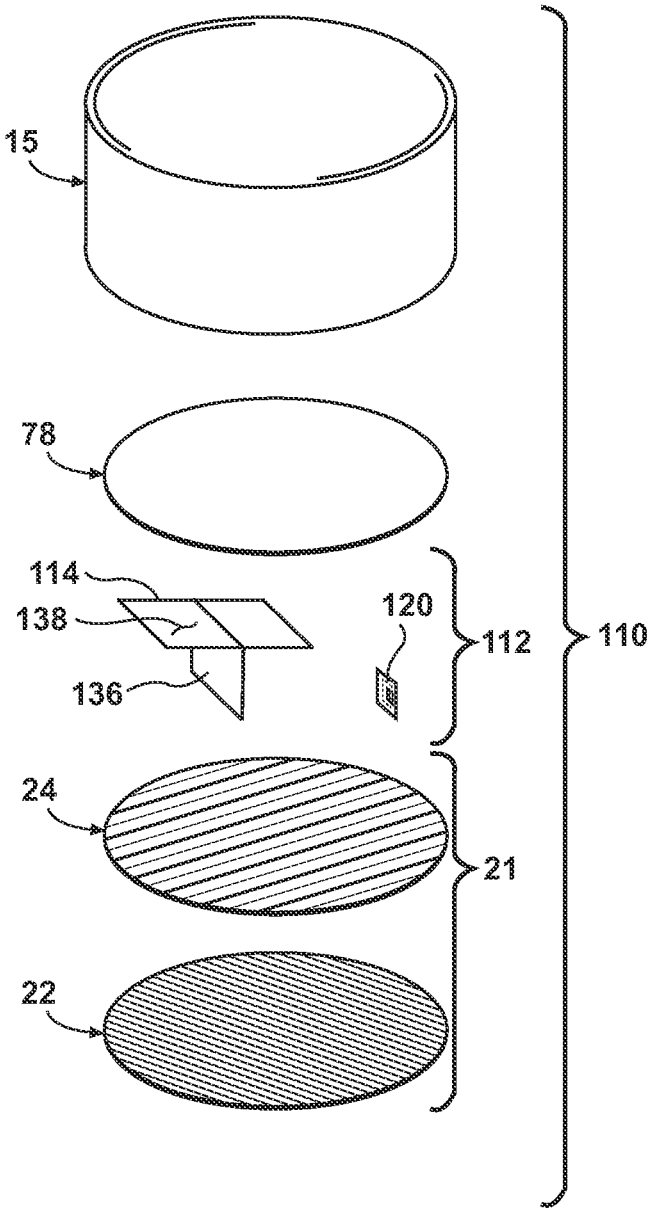
FIG. 14 is an exploded view of an eighth exemplary embodiment of a closure assembly including an RFID tag for selective incorporation into the closure assembly.
Figure 15:
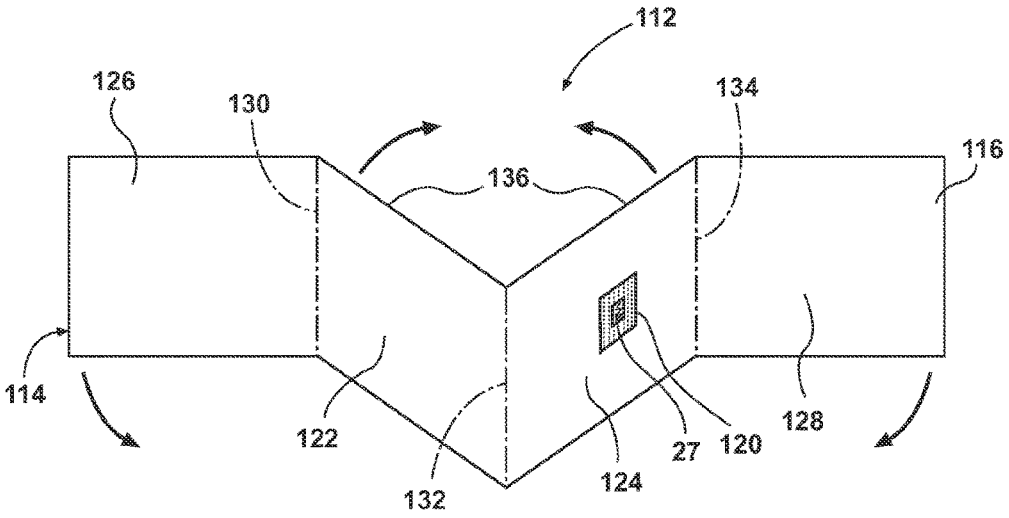
FIG. 15 is an enlarged perspective view of a film strap comprising part of the RFID tag illustrated in FIG. 14.

In an eighth exemplary embodiment illustrated in FIGS. 14 and 15, an RFID closure assembly 110 includes an RFID tag assembly 112 having an RFID tag 120 mounted to an RFID hang tab 114. The RFID hang tab 114 can be suspended from an attachment liner, such as the backing liner 78, the metallic foil 24, or another suitable liner, as a pull-tab-like appendage extending downwardly into the interior space 18. FIG. 14 illustrates the RFID closure assembly 110 as including a closure 15, a backing liner 78, an RFID tag assembly 112, and an inner seal 21 comprising a metallic foil 24 and a sealable film 22.

The exemplary embodiment of FIGS. 14 and 15 can be manufactured and utilized in the same general manner as the embodiments illustrated in the previously-referenced Figures. The hang tab 114 can have any suitable configuration such as semicircular, or strap-like, suspended from the center of the attachment liner or from another selected location on the attachment liner. In this embodiment, a separate pull tab in general accordance with the previously described pull-tabs can be incorporated, or not, into the closure assembly 110.

The backing liner 78 can be a material as previously described herein, suitable for repeatedly sealing a container opening 16 after the closure 15 has been first removed by an end-user, and the contents of the container initially accessed. The backing liner 78 can comprise a foam, or other resilient, compressible material, suitable for sealing the container opening 16 after the closure 15 has been reattached. The backing liner 78 can be frictionally or mechanically engaged with the top of the closure 15, including using an adhesive.

The exemplary RFID tag assembly 112 is illustrated in FIGS. 14 and 15 as a somewhat T-shaped hang tab 114 and an RFID tag 120. The RFID tag 120 can include a microprocessor and an antenna generally as previously described herein. The hang tab 114 can comprise a polymeric material having properties suitable for the purposes described herein, such as radio-frequency transparency, strength, electrical insulation/isolation, and the like. Alternatively, the hang tab 114 can comprise a metallic foil integrated generally as previously described herein with a microprocessor, with suitable isolation of the microprocessor from the hang tab 114, also generally as previously described herein.

As illustrated in FIG. 15, the hang tab 114 can comprise an elongated strap 116 accommodating a pair of intermediate fold lines and 130, 134, and a medial fold line 132, extending transverse to the longitudinal axis of the strap 116. The fold lines 130, 132, 134 enable the strap 116 to be folded into the hang tab 114 shown in FIG. 14, and define a pair of center panels 122, 124 between the medial fold line 132 and intermediate fold lines 130, 134, and a pair of outer panels 126, 128 between the intermediate fold lines 130, 134 and the ends of the RFID strap 116. The joined center panels 122, 124 can define an RFID envelope 136 for holding the RFID tag 120. The joined center panels 122, 124 can also define an attachment flange 138 for attaching the hang tab 114 from, as an example, the backing liner 78.

Prior to folding the RFID strap 116, the RFID tag 120 can be sandwiched between the 2 center panels 122, 124, which can be suitably joined together, such as by an adhesive to form the RFID envelope 136. Enclosing the RFID tag 120 in the RFID envelope 136 can provide protection to the RFID tag 120. The RFID tag 120 can be electrically coupled with one or both of the center panels 122, 124 so that one or both center panels can serve as a radio-frequency or high frequency antenna.

With the RFID strap 116 folded into the T-shaped configuration, an adhesive can be applied to the attachment flange 138 for attaching the RFID tag assembly 112 to a suitable surface, such as the backing liner 78. The RFID tag assembly 112 can be attached to the backing liner 78 either before or after the backing liner 78 is joined to the closure 15. With either process, the metallic foil 24 and sealable film 22 can be joined to the closure 15 as with the backing liner 78. Prior to adding the metallic foil 24 and sealable film 22, the RFID envelope 136 can be folded against the backing liner 78, or the closed end of the closure 15, thereby sandwiching the RFID envelope 136 between the backing liner 78 or closure end and the metallic foil 24 when the closure 15 is tightened onto the container 12.

Other configurations of an RFID hang tab can be utilized. For example, the strap can have a single fold line dividing the strap into a pair of panels (not shown) disposed in an L-shape to define an attachment flange and an RFID tag carrier. The attachment flange can be provided with an adhesive for attaching the RFID hang tab to a backing disc, and the RFID tag carrier can support an RFID tag, and can be adapted as an antenna as previously described herein. The closure assembly described herein enables the RFID tag to be incorporated into the closure assembly at a relatively early stage in the manufacturing process, which can enhance efficiency and thereby contribute to lower cost and improvements in quality control.

Figure 16:
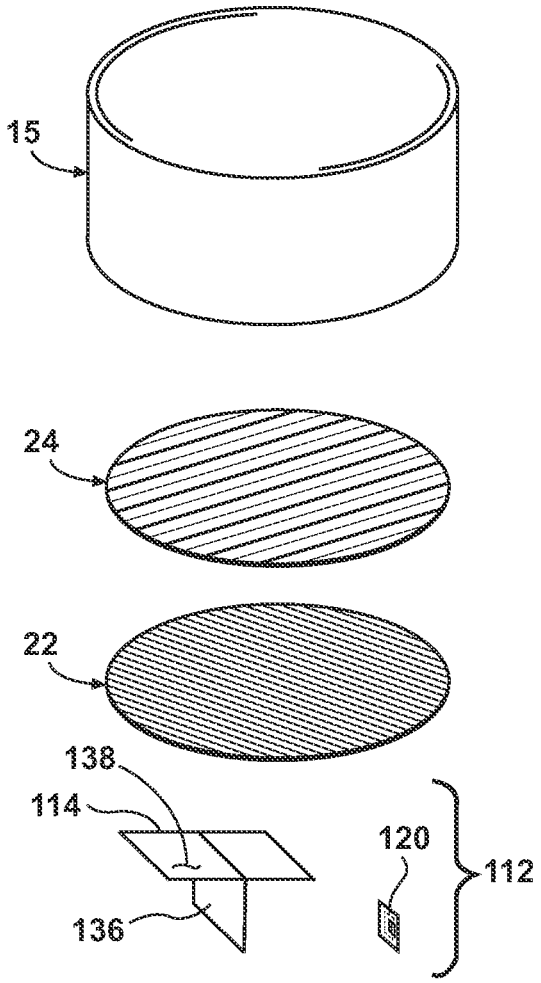
FIG. 16 is an exploded view of a ninth exemplary embodiment of a closure assembly including an RFID tag for selective incorporation into the closure assembly.

In a ninth exemplary embodiment, illustrated in FIG. 16, the RFID tag 120 can be attached to the metallic foil 24 and/or sealable film 22, rather than the backing liner 78, to extend into the container 12 when the RFID closure assembly 110 has been attached over the container opening 16. Alternatively, the RFID tag 120 can be inserted between the metallic foil 24 and sealable film 22. In either configuration, the microprocessor 27 must be electrically insulated/isolated from the metallic foil 24.

Alternatively, an RFID tag can be incorporated into a backing disc during manufacture of the backing disc. Backing discs can be manufactured from a stock material already supplied with RFID tags. RFID tags can be added to a stock material immediately prior to or after separating the backing discs from the stock material. An RFID tag can be attached to a surface of a backing disc, such as a surface engaging the closed end of a closure, or incorporated into the interior of a backing disc, such as in a pocket formed in the backing disc or between layers of a laminated backing disc.

Moreover, an RFID tag can be added to a closure, for example affixed to the closed end of the closure, after manufacture of the closure but prior to the addition of a backing liner or inner seal. The RFID tag can thus be concealed by the backing liner or inner seal. If the reclosable container is to hold pharmaceuticals that may be eroded or fractured during handling, an RFID tag can be incorporated into the cushioning material that is inserted into the container and occupies the space between the product and the closure assembly.

The closure assembly is advantageous in that it can be readily manufactured, with the RFID tag incorporated into the closure assembly during production of the closure assembly, or at some other time and location. For example, sealing of the container can be expected to occur after filling the container with a selected product. Thus, the closure assembly and container can be fabricated, stored, and transported separately until after the filling step.

RFID tags can be incorporated into a closure assembly during any of several process steps, such as during the manufacture of the closure assembly, or the filling and sealing of the container. Factors such as the production of reclosable containers both with and without RFID tags, the information to be stored and transmitted by an RFID tag, the stage at which information is available for storage on an RFID tag, the preferred configuration of an RFID tag as incorporated into a closure assembly and container, and the like, can give rise to a need for flexibility in the incorporation of an RFID tag into a reclosable container. Fabrication, encoding, and incorporation of an RFID tag can be controlled by an entity other than the closure assembly manufacturer, such as a product manufacturer or a container filler, and at an optimal step in the process, such as at the time that the container is filled.

Figure 17:
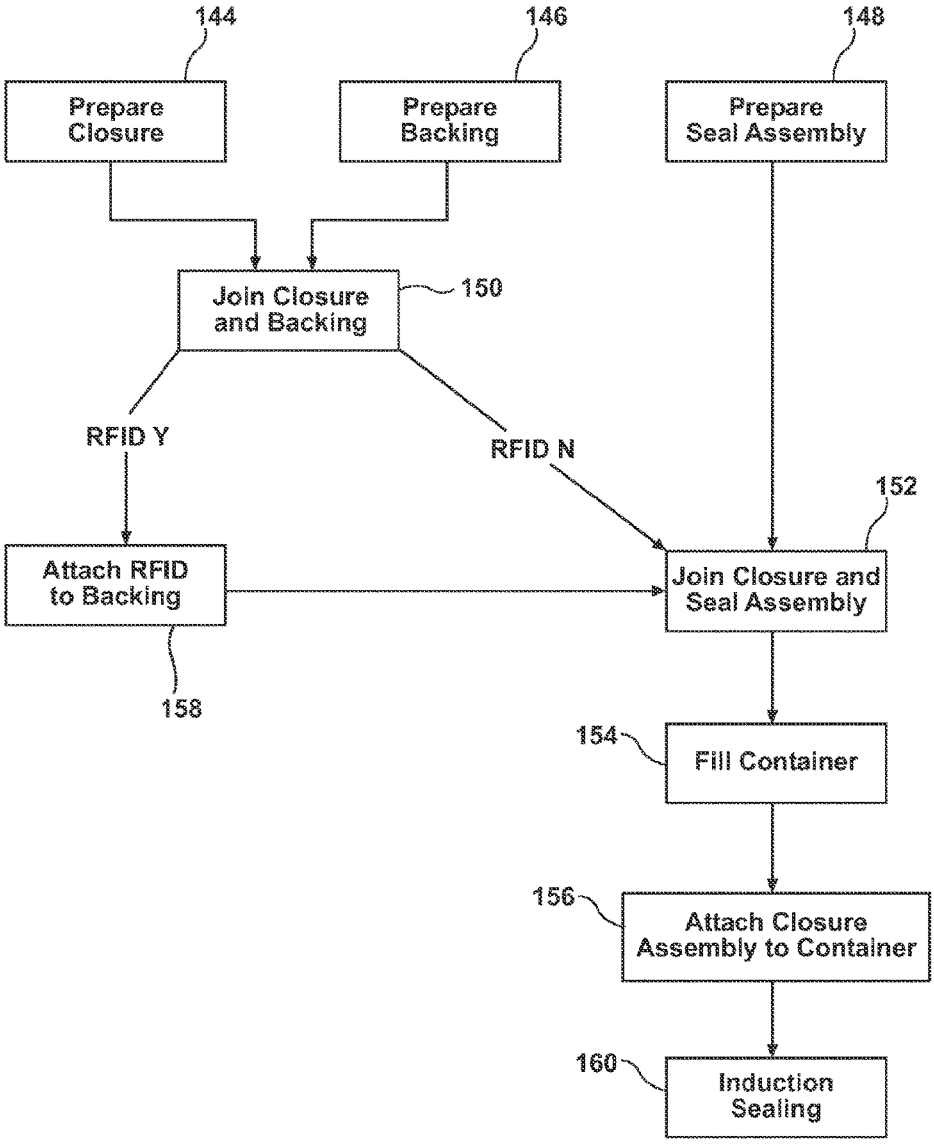
FIG. 17 is a flow-chart illustrating a first embodiment of a sequence of process steps for fabricating a closure assembly having an RFID tag.

FIG. 17 illustrates an exemplary process of fabricating, filling, and sealing a container having an RFID closure assembly. In this process, closures are prepared in step 144, backing is prepared in step 146, and a seal assembly is prepared in step 148. The steps 144, 146, 148 can proceed in parallel. The closure and backing can be assembled in a joining step 150. If no RFID tag is to be utilized, the closure assembly and closure can be assembled in a joining step 152, followed by or during a container filling step 154, and followed by assembly of the filled container and closure assembly in a joining step 156. If induction sealing is to be utilized, this can occur in a sealing step 160.

If an RFID tag is to be utilized, after the joining step 150 the RFID tag can be attached to the backing in an RFID joining step 158. This can be followed by the joining step 152, the filling step 154, and the closure joining step 156. The process is completed by the sealing step 160. A closure manufacturer can implement the steps 144, 146, 148, 150, and 152. Step 158 can also be implemented by a closure manufacturer. Otherwise, the RFID tag can be added by an RFID supplier, or by a product manufacturer, product filler, or product distributor.

The addition of an RFID tag to a closure assembly can occur in an alternative sequence of steps suitable for a selected process of manufacturing a product, fabricating closure assemblies and containers, filling containers with a product, and distributing filled containers. For example, an RFID tag can be added to the backing during preparation of the backing, prior to joining the backing with the closure.

Figure 18:
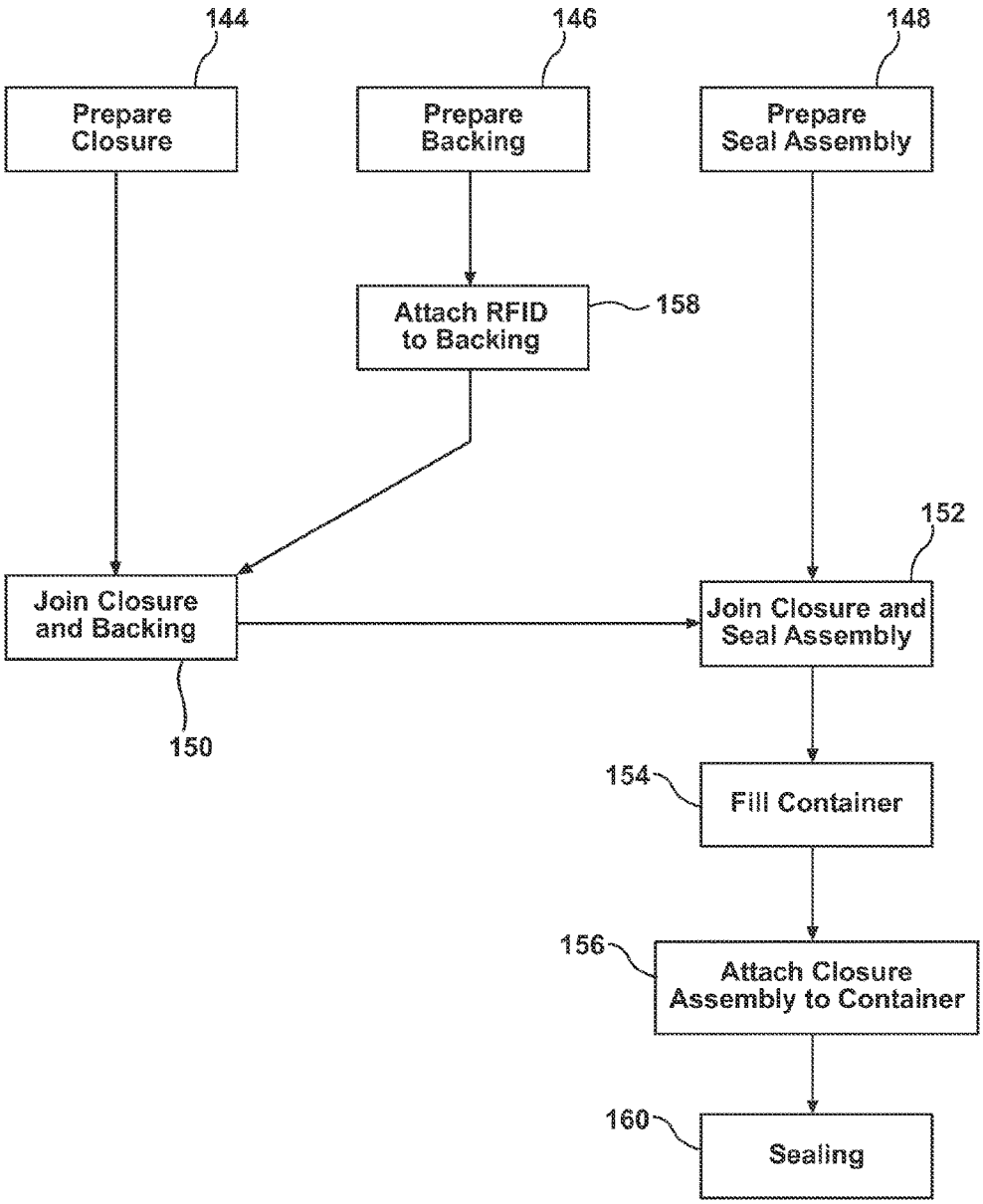
FIG. 18 is a flow-chart illustrating a second embodiment of a sequence of process steps for fabricating a closure assembly having an RFID tag.

FIG. 18 illustrates another exemplary process of fabricating, filling, and sealing a container having an RFID closure assembly. The process illustrated in FIG. 18 is similar to that illustrated in FIG. 17. However, prior to joining the closure and backing in step 150, the RFID tag is attached to the backing disc in an RFID attachment. Step 158. This is followed by joining the closure assembly and backing disc in a joining step 150, and joining the closure assembly and closure assembly in a joining step 152. The process can culminate in a container filling step 154, a closure joining step 156, and a sealing step 160.

Figure 19:
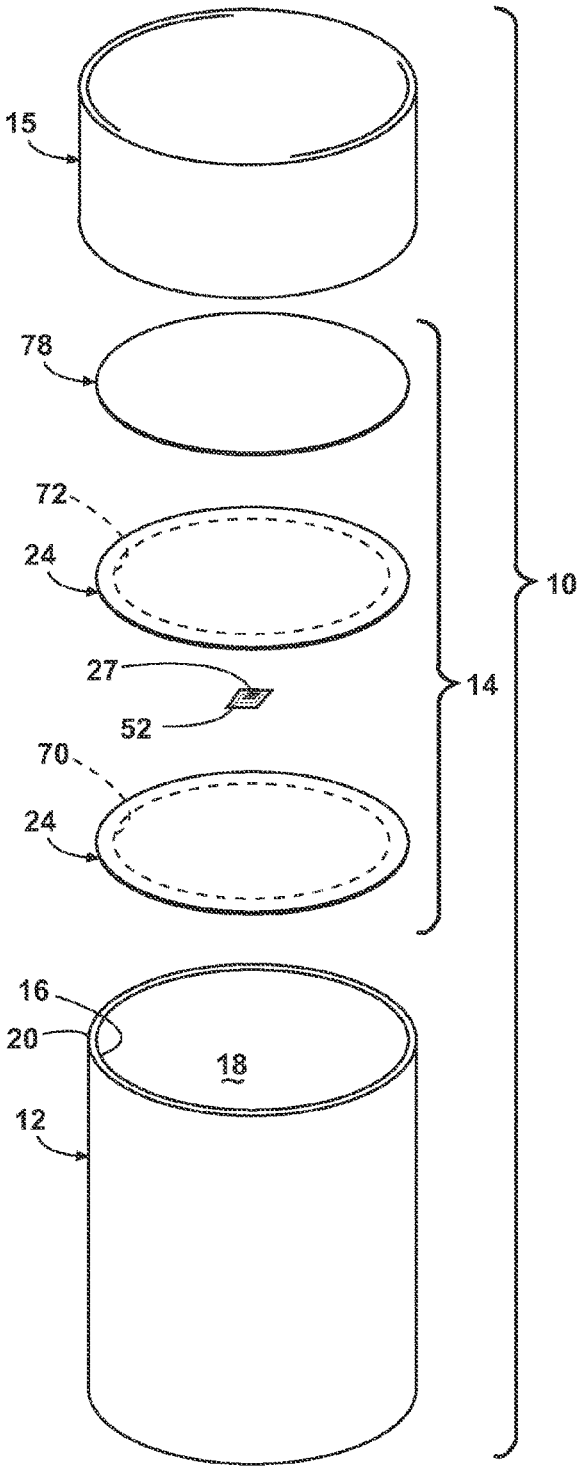
FIG. 19 is an exploded view of a tenth exemplary embodiment of a closure assembly including an RFID tag for selective incorporation into the closure assembly.

FIG. 19 illustrates yet another exemplary embodiment of an RFID closure assembly according to the invention. The embodiment of FIG. 19 includes a container 12, the closure 15, a backing liner 78, an inlay including a microprocessor 27 electrically coupled with an antenna 52, and a pair of metallic foils 24, each generally as previously described herein. The metallic foils 24 can be sealed together along a lower glue line 70 and an upper glue line 72, leaving a center pocket. The inlay can be inserted between the metallic foils 24 prior to sealing so that the inlay is retained within the center pocket. Based upon factors such as the size and configuration of the antenna, the frequency at which the inlay operates, e.g. LF, HF and UHF, characteristics of the transmitter/reader, whether the inlay is active or passive, and the like, electromagnetic interference from contact of the inlay with either metallic foil 24 can be minimized or eliminated.

Alternatively, one or more electromagnetically neutral linings can be retained between the metallic foils 24 to enclose the inlay and isolate the inlay from the metallic foils 24. The metallic foils 24 can also enclose the inlay without being sealed together, thereby enabling the inlay to "float" between the metallic foils 24.

In another alternate configuration, the metallic foils can be fabricated to be thicker than the heretofore described metallic foils 24, even to the extent of being essentially inflexible. The metallic foils can be cast rather than drawn or rolled, and can be fabricated such that the inlay is incorporated during the casting process. The performance of the inlay can, as described above, can be optimized based upon the size and configuration of the antenna, the frequency at which the inlay operates, characteristics of the transmitter/ reader, whether the inlay is active or passive, properties of the metallic foils, and the like.

Figure 20:
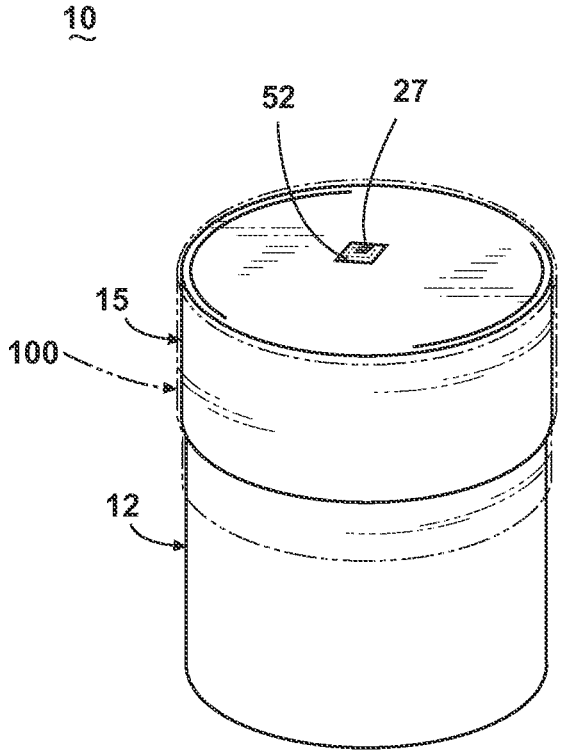
FIG. 20 is a partially exploded view of an eleventh exemplary embodiment of a closure assembly including an RFID tag for selective incorporation into the closure assembly.

FIG. 20 illustrates another exemplary embodiment of an RFID closure assembly according to the invention. In the embodiment of FIG. 20, the container assembly 10 is shown as closed, with only the container 12 and closure 15 visible. An inlay including a microprocessor 27 and an antenna 52 is positioned on the end wall of the closure 15. The container assembly 10 includes an exterior seal 100 extending over at least a portion of the container assembly 10, such as the closure 15 and an upper part of the container 12. The exterior seal 100 can include a suitable material, such as a shrink wrap. With this exemplary embodiment, the inlay can be attached to the closure 15, or the container 12, provided it is overlaid by the exterior seal 100. Alternatively, the inlay can be incorporated into the exterior seal 100 to be positioned at a selected location relative to the container assembly 10. The exterior seal 100 and inlay can be configured so that, when the exterior seal 100 is removed, the inlay can be removed along with it, and thus disposed, thereby eliminating potential privacy concerns. An internal inlay can also be incorporated into the closure assembly as previously described herein, so that if the exterior seal 100 and inlay are removed, the internal inlay will remain with the container assembly 10.

An RFID tag can be incorporated into the container assembly 10 at a relatively early stage in a distribution process, and can increase efficiencies of production/fabrication, thereby contributing to lower consumer costs and enhancing quality control.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A closure assembly for a container defining an interior volume, an opening into said interior volume, and a sealing surface bordering said opening, [will] *with* a closure, including an end wall with an end wall inner surface, said closure being attachable over a container opening for closing thereof;

an inner seal comprising a sealable film laminated to a metallic foil, said inner seal including a first surface for sealing engagement with a container sealing surface, and a second, opposed surface for non-sealing engagement with one of a backing liner, a facing liner, and a glued-in closure liner; [and]

a radio frequency identification tag including a microprocessor electrically coupled with an antenna for receiving, storing, and transmitting selected digitized information;

wherein said inner seal minimizes migration of fluids between a container interior volume and an exterior of a container when said inner seal is sealingly engaged with a container sealing surface; and

*an isolation device* wherein said [radio frequency identification tag is includable in said closure assembly without said closure assembly] *microprocessor is* electromagnetically [interfering with] *isolated from said metallic foil to minimize electromagnetic interference with* said receiving, storing, or transmitting of said digitized information.

2. A closure assembly as set forth in claim 1 wherein said [inner seal further] *isolation device* includes a tab coextensively appended [thereto] *to said inner seal*.

3. A closure assembly as set forth in claim 2 wherein said tab extends radially therefrom.

4. A closure assembly as set forth in claim 2 wherein a first surface of said tab is coextensive with said first surface of said inner seal, and a second surface of said tab is coextensive with said second surface of said inner seal.

5. A closure assembly as set forth in claim 2 wherein said tab is foldable along either said first surface or said second surface of said inner seal.

6. A closure assembly as set forth in claim 2 wherein said inner seal comprises an induction seal liner including an impermeable metallic foil.

7. A closure assembly as set forth in claim 6, [and further comprising] *wherein said isolation device comprises* an electromagnetically insulative liner disposed against either said first surface or said second surface to electromagnetically isolate said [radio frequency identification tag] *microprocessor* from said inner seal.

8. A closure assembly as set forth in claim 2 wherein said microprocessor is attached to said tab.

9. A closure assembly as set forth in claims 8 wherein said tab and at least part of said inner seal comprise said antenna.

10. A closure assembly as set forth in claim 9 wherein said tab is longitudinally bifurcated into 2 parallel fingers for attachment of said microprocessor therebetween.

11. A closure assembly as set forth in claim 10, and further comprising an electromagnetically insulative liner disposed against either said first surface or said second surface to electromagnetically isolate said microprocessor from said inner seal.

12. A closure assembly as set forth in claim 1, [and further including] *wherein said isolation device includes* a pull-tab liner hingedly laminated to said metallic foil for facilitating removal of said inner seal from said sealing surface.

13. A closure assembly as set forth in claim 12 wherein a portion of said pull-tab liner can be hingedly separated from a portion of said metallic foil.

14. A closure assembly as set forth in claim 13 wherein said portion of said pull-tab liner includes an upper surface and a lower surface, and said radio frequency identification tag is attachable to either said upper surface or said lower surface.

15. A closure assembly as set forth in claim 13, and further including a radio frequency identification tag protection liner hingedly disposed against said pull-tab liner for emplacement of said radio-frequency identification tag therebetween.

16. A closure assembly as set forth in claim 15 wherein a perimeter of said radio frequency identification tag protection liner can be fixedly attached along a perimeter of said pull-tab liner to seal said radio frequency identification tag therebetween.

17. A closure assembly as set forth in claim 1, and further comprising a hang tab attachable to said inner seal for suspending said radio frequency identification tag in said container interior volume.

18. A closure assembly as set forth in claim 17 wherein said hang tab is attachable to one of said inner seal first surface or said inner seal second surface.

19. A closure assembly as set forth in claim 1, and further comprising a backing liner disposed against said closure end wall inner surface wherein said radio frequency identification tag is attachable to said backing liner.

20. A closure assembly as set forth in claim 1 wherein at least part of said inner seal comprises said antenna.

21. A closure assembly as set forth in claim 1 wherein said inner seal comprises a pair of metallic foils.

22. A closure assembly as set forth in claim 21 wherein said radio frequency identification tag is interposed between said pair of metallic foils.

*23. A container assembly comprising:*

*a container having an interior volume and an opening into the interior volume defined by a rim having a sealing surface,*

*a reclosable protective closure covering the opening and configured for suitable registry with the sealing surface to facilitate sealing of the opening,*

*an exterior seal extending over the reclosable protective closure and at least an upper part of the container to minimize migration of content in the interior volume to an exterior of the container and contaminants from the exterior to content in the interior volume, and*

*a radio frequency identification (RFID) tag including a programmable microprocessor electromagnetically coupled with an antenna for receiving, storing, and transmitting digitized information,*

*wherein the RFID tag is mounted between the exterior seal and one of the container or the reclosable protective closure wherein the programmable microprocessor is electromagnetically isolated to minimize electromagnetic interference with the receiving, storing, and transmitting of the digitized information.*

*24. A container assembly as set forth in claim 23 wherein the RFID tag is an inlay including the microprocessor and the antenna.*

*25. A container assembly as set forth in claim 23 wherein the exterior seal is a shrink wrap.*

*26. A container assembly as set forth in claim 23 wherein the RFID tag is attached to one of the closure, container, or exterior seal.*

*27. A container assembly as set forth in claim 23 further comprising an internal inlay incorporated into one of the closure or container that remains with the one of the closure or container if the exterior seal and RFID tag are removed.*

* * * * *